INVENTOR.
R. M. NETI
T. J. KELLY
BY
ATTORNEY

United States Patent Office 3,540,849
Patented Nov. 17, 1970

3,540,849
ANALYSIS OF ALDEHYDES, UNSATURATED
HYDROCARBONS AND KETONES
Radhakrishna M. Neti, Bea, and Tom J. Kelly, Rowland
Heights, Calif., assignors to Beckman Instruments, Inc.,
a corporation of California
Filed June 17, 1968, Ser. No. 737,666
Int. Cl. G01n 31/10
U.S. Cl. 23—230
8 Claims

ABSTRACT OF THE DISCLOSURE

Method and apparatus for determining aldehydes, unsaturated hydrocarbons and ketones in gases and liquids. A sample containing one or more of these constituents is photoexcited by ultraviolet radiation in the presence of oxygen to photo-oxidize the constituents thus forming peroxy acids. Means such as spectrophotometric techniques or by reacting the acid with an aqueous halide solution to convert the halide ions to free halogen which can then be determined electrochemically or spectrophotometrically is provided for determining the peroxy acids as a function of the content of these constituents in the sample. The invention is particularly applicable to the monitoring of air for air pollution control.

BACKGROUND OF THE INVENTION

This invention relates generally to the analysis of aldehydes, unsaturated hydrocarbons and ketones, and, more particularly, to an improved apparatus and method for analyzing these constituents in both gaseous and liquid samples.

Aldehydes, unsaturated hydrocarbons and ketones are common irritating components found in polluted air. For example, formaldehyde is a major source of eye irritation. In order that dangerous levels of these constituents may be known and corrective measures may be taken, means is required for practically and inexpensively determining the level of these constituents in air. While the present description of the invention is directed primarily to the determination of aldehydes, it is to be understood that the invention is also applicable to the determination of the other air pollutants mentioned above, namely, unsaturated hydrocarbons and ketones.

The only aldehyde analyzer which has been available to date is an elaborate wet chemical instrument in which the air being monitored is bubbled through a batch solution of mercuric chloride, potassium chloride and sodium or potassium sulfite to form a complex which is made to further react with P-rosaniline hydrochloride to form a highly colored product which, by the depth of its color, indicates the amount of aldehyde in the air sample. This colorimetric apparatus is expensive, complicated and requires complex equipment to translate the color into an electrical signal. The procedure is time consuming, temperature dependent and does not produce an output signal which is quantitatively related to the aldehyde content of the sample gas. This prior apparatus also has the disadvantage that its sensitivity to different aldehydes varies. Finally, the aforementioned apparatus has the disadvantage that it analyzes aldehyde samples on a batch basis rather than providing a continuous monitoring of the aldehyde level of a gas sample stream.

SUMMARY OF THE INVENTION

The principal object of the present invention is to provide improved means for determining aldehydes, as well as unsaturated hydrocarbons and ketones.

Another object of the invention is to provide means for continuously monitoring trace amounts of aldehydes, unsaturated hydrocarbons and ketones in gas, and particularly in air.

Another object of the invention is to provide means for determining the amount of aldehydes, unsaturated hydrocarbons and ketones in solutions.

According to the principal aspect of the present invention, a sample containing an aldehyde, for example, is photoexcited in the presence of oxygen to convert the aldehyde into a peroxy acid. The aldehyde is converted into a peroxy acid by virtue of the fact that the photoexcited aldehyde—presumably a free radical—reacts with oxygen. The oxygen may be either atomic or molecular. The peroxy acid content of the sample may be determined directly by spectrophotometric techniques or indirected by reacting the acid with an aqueous halide solution to convert the halide ions to free halogen. The free halogen may then be analyzed electrochemically or spectrophotometrically. In the latter case, the halogen content of the solution is determined as a function of the peroxy acid formed by the method, which in turn is related to the aldehyde content of the sample. The present invention has the advantage over the prior aldehyde detecting technique in that it lends itself to inexpensive and rapid monitoring of aldehydes in air on a continuous basis. The invention is also applicable to the determination of unsaturated hydrocarbons and ketones.

Other objects, aspects and advantages of the invention will become more apparent from the following description taken in connection with the accompanying drawing.

DESCRIPTION OF THE PREFERRED EMBODIMENTS

The present invention is based upon the principle that when an aldehyde is photoexcited by a suitable source of radiation in the presence of oxygen, the aldehyde will be oxidized to a peroxy acid. This peroxy acid is determined directly or indirectly in the manner which will be described later to provide a measure of the aldehyde content of the sample.

When a fluid containing an aldehyde and oxygen is photoexcited, the following reactions occur:

(1)

(2)

(3)

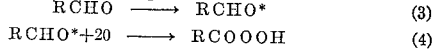
(4)

where the symbol RCHO* indicates an excited aldehyde molecule.

It is seen from the above reactions that the oxygen which is subjected to photoexcitation disassociates to atomic oxygen and also forms ozone, and the excited aldehyde molecule is oxidized by the atomic oxygen to peroxy acid. It is possible that the excited aldehyde molecule may also react to some degree with molecular oxygen which is present.

The present invention is applicable to the determination of both aliphatic or aromatic aldehydes. Typical aliphatic aldehydres are formaldehyde and acetaldehyde. when these aldehydes are photoexcited in the presence of oxygen, they are photo-oxidized to peroxyformic acid and peroxyacetic acid, respectively,. A typical aromatic aldehyde is benzaldehyde which is photo-oxidized by photoexcitation in the presence of oxygen to peroxybenzoic acid. As previously stated, the invention is also applicable to the determination of unsaturated hydrocarbons, such as ethylene or acetylene, and to ketones, for example acetone. These constituents will be converted into peroxy acids when photoexcited in the presence of oxygen in the same fashion as discussed above above with respect to aldehydes.

Figure 1:
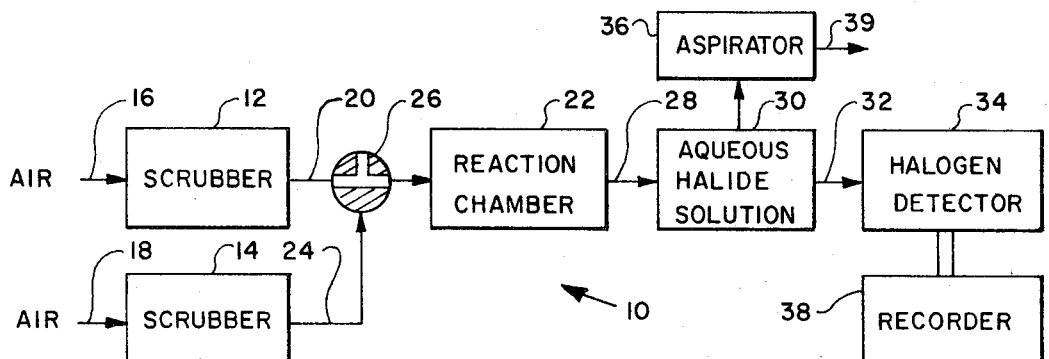
FIG. 1 is a schematic view of the preferred form of the invention utilized for continuously monitoring aldehydes in air.

The present invention has its most important application in the continuous monitoring of the above mentioned constituents in polluted air. There is illustrated in FIG. 1 a preferred apparatus for determining these constituents in air, such apparatus being generally designated by numeral 10. While the apparatus will be described specifically for determining aldehydes, it will be appreciated that the apparatus will also determine unsaturated hydrocarbons and ketones in the air samples. The apparatus includes two scrubbers 12 and 14 each having a respective air inlet conduit 16 and 18. The scrubber 12 is connected by a conduit 20 to a reaction chamber 22.

The reaction chamber 22 contains a source of radiation, not shown, for photoexciting the gas sample in the chamber. A suitable source of radiation for practicing the present invention is a double bore quartz lamp sold under the trade name Pen-Ray Lamp, Model No. 11SC-1, marketed by Ultra-Violet Products, Inc. of San Gabriel, Calif. This lamp emits a narrow band of ultra-violet radiation centered about a wavelength of about 1849 A. at which formaldehyde is most efficiently photoexcited. However, other radiation sources could be employed, including those emitting radiation outside the UV spectrum, if they are capable of photo-exciting the particular aldehyde molecules being determined and of disassociating molecular oxygen into atomic oxygen and, consequently, of photo-oxidizing the aldehydes to peroxy acid.

A conduit 24 connected to the outlet of the scrubber 14 joins the conduit 20 between the scrubber 12 and reaction chamber 22. A three-way valve 26 is provided at the junction of the conduits 20 and 24 for controlling the flow of gases from the two scrubbers 12 and 14 to the reaction chamber.

The effluent from the reaction chamber 22 is conveyed by means of a conduit 28 to a chamber 30 containing aqueous halide solution. This chamber is connected by a conduit 32 to a halogen detector 34. The air entering the inlet conduits 16 and 18 at the upstream end of the apparatus is drawn through the scrubbers 12 and 14 and reaction chamber 22, bubbled through the aqueous halide solution in chamber 30 and vented to the atmosphere by means of an aspirator 36. Obviously suitable pumping means could be provided at the inlet conduit 16 and 18 for conveying the air through the apparatus. The conduits in the apparatus preferably are tubes of chemically inert material such as polytetrafluoroalkane.

In the preferred form of the invention, the halogen detector 34 is a coulometric galvanic cell as disclosed in U.S. Pat. No. 3,314,864 to Hersch. This cell is provided with an anode of active carbon or in some cases silver or mercury, and a cathode of inert conductive material such as platinum or graphite. The electrodes are joined by an aqueous halide electrolyte, preferably an iodide electrolyte although a bromide electrolyte could be used. The cell includes a reaction section into which the gas sample is initially delivered so that oxidizing species in the sample may convert the iodide ions of the electrolyte in the reaction section to free iodine. This iodine is passed over the cathode of the cell where it is reduced back to iodide, and an electrical current flows in the external circuit connected to the electrodes which is a measure of the rate of supply of iodine and is related to this rate by Faraday's law. In FIG. 1, the chamber 30 represents the reaction section of the Hersch cell while the detector 34 represents the section of the Hersch cell in which the electrodes are contained. It is understood that the halogen detector 34 includes some means for indicating the current output of the cell. This may be a microammeter or a suitable recorder 38.

The scrubber 12 contains materials which remove from the air sample stream constituents other than aldehydes which will either oxidize iodide ions to produce iodine or consume iodine in the cell. Such constituents are generally referred to as interferents in the analysis procedure, and include mercaptans, hydrogen sulfide, ozone, nitrogen dioxide, sulfur dioxide and chlorine. A combination of $HgCl_2$, $Hg[SH]_2$, $Ca[OH]_2$ and $Ag_2O$ has been found to efficiently remove these interferents and not affect the aldehyde content of the air sample stream, nor unsaturated hydrocarbons or ketones if they are present in the sample. Thus, when a polluted air sample stream is drawn through the scrubber 12, the effluent from the scrubber will consist essentially of a mixture of nitrogen, oxygen and aldehydes. When the valve 26 is positioned as shown in FIG. 1, the effluent from the scrubber will pass to the reaction chamber 22 where it is subjected to ultraviolet radiation. The reaction occurring in the chamber 22 is represented by Equations 1 to 4 above with the result that the aldehydes in the sample stream are photo-oxidized to peroxy acid. The effluent from the chamber 22 containing the peroxy acid passes via the conduit 28 into the aqueous halide solution in chamber 30. Peroxy acid is a powerful oxidizing agent. It oxidizes the iodide rapidly and liberates free iodine. The gas entering the chamber 30 exists therefrom via the aspirator 36 and a vent 39 while the aqueous solution containing free iodine passes to the electrode section of the Hersch cell, represented schematically by numeral 34 in FIG. 1. As discussed above, in the cell iodine is reduced at the cathode to iodide and a galvanic current is produced which is a measure of the rate of supply of iodine to the cell. This current is proportional to the rate of supply of both peroxy acid and ozone conveyed from the reaction chamber 22 to the chamber 30. Thus, with the valve 26 positioned as seen in FIG. 1, a first output signal is produced by the detector 34 which is proportional to the aldehyde and ozone content of the air sample stream.

In order to determine the aldehyde content of the air sample stream, it is necessary to determine that portion of the current output of the detector 34 which results from the ozone produced in the reaction chamber 22. This is achieved by providing in the scrubber 14 materials which remove aldehydes as well as the above-mentioned interferents from the air sample stream. A suitable combination of materials for this purpose is carbon and calcium hydroxide. Thus, when air is passed into the scrubber 14, the effluent from the scrubber will comprise essentially a mixture of nitrogen and oxygen, and the oxygen content of the effluent will be equal to the oxygen content of the effluent from the scrubber 12. The valve 26 is positioned to permit effluent from the scrubber 14 to pass through the conduit 24 and conduit 20 to the reaction chamber 22. There the oxygen in the gas stream will be converted to ozone at the same rate that the oxygen in the effluent from scrubber 12 is converted to ozone. The effluent containing the ozone then passes from the reaction chamber 22 into the halide solution in chamber 30. The solution is conveyed to the halogen detector 34 whereupon a second output signal is produced which is a function of the ozone produced in the reaction chamber 22. It can be seen that by determining the difference between the first output signal resulting from the air entering conduit 16 and the second output signal resulting from the air entering inlet conduit 18, a value results which corresponds to the aldehyde content of the sample.

In the practical operation of apparatus 10, the valve 26 is positioned so that air will pass through the scrubber 14 to provide a first output signal by the detector 34. The signal level of the detector is then adjusted so that the first output signal corresponds to actual zero or the base line of the detector. Then the valve 22 is shifted to the position shown in FIG. 1 so that thereafter the signal produced by the detector provides a direct indication of the aldehyde content of the air sample stream.

The above-described apparatus has been utilized for monitoring standard aldehyde and air mixtures with the result that the signal output of the Hersch cell corresponds quantitatively to the aldehyde content of the sample. The apparatus is capable of detecting levels of aldehydes as low as 10 p.p.b.

The apparatus 10 has the advantage, besides being capable of continuously monitoring the aldehyde content of air, of being relatively inexpensive, fast responding, and is not temperature dependent. Moreover, the apparatus has equal sensitivity to different aldehydes.

In order to elucidate the reactions which occur in the chamber 22, an aldehyde sample was made in purified nitrogen. This nitrogen-aldehyde sample was passed through the apparatus with the result that no electrical signal was observed. When an air sample was passed through the apparatus with the ultraviolet light source de-energized, again no output signal was observed. When an ozone and aldehyde gas mixture was passed through the reaction chamber with the ultraviolet light source de-energized, no output signal was observed. These experiments lead to the conclusion that the aldehydes react with atomic oxygen produced in the chamber and most likely with some molecular oxygen in the presence of the ultraviolet light to yield the peroxy acid. It is of course understood that the oxygen content of the sample gas stream must be adequate to provide equivalent or excess amounts of atomic oxygen when photoexcited to produce quantitative oxidation of the aldehydes in the sample. When air is the sample gas, the oxygen in the air is normally in sufficient supply to permit the quantitative oxidation of the aldehydes.

In a modified form of the apparatus 10, the halogen detector 34 may be a UV or IR spectrophotometer which is calibrated to detect iodine. However, this arrangement has the disadvantage over one employing a Hersch galvanic cell in that the spectrophotometer is substantially more complex and expensive than the Hersch cell.

It can be appreciated that the scrubber 14 and valve 26 may be eliminated from the apparatus 10 by placing between the reaction chamber 22 and elyectrolyte chamber 30 a scrubber, not shown, which is capable of selectively scrubbing or removing ozone, that is, will remove ozone efficiently but will not affect the peroxy acid content of the effluent emanating from chamber 22. With such a scrubber, the current output of the halogen detector 34 will be a direct measure of the peroxy acid content of the effluent from chamber 22, and thus proportional to the aldehyde content of the sample stream.

Figure 2:
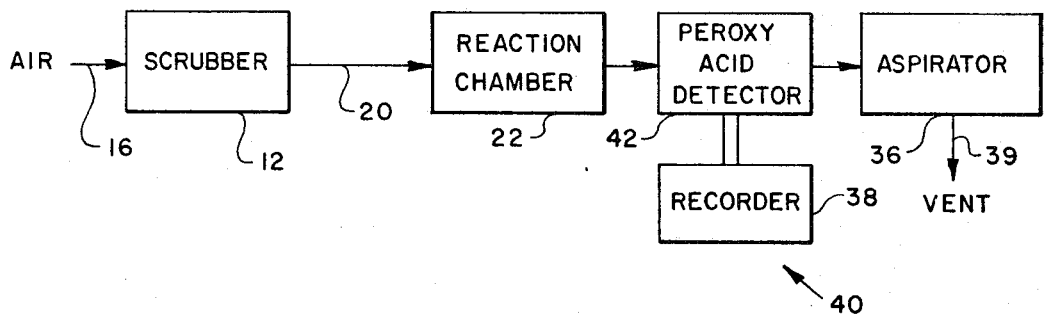
FIG. 2 is a schematic view of a second form of the invention for monitoring aldehydes in air.

Another embodiment of the invention 40 is illustrated in FIG. 2 wherein like reference characters designate parts corresponding to those illustrated in FIG. 1. In this embodiment of the invention, the detector 42 is a UV or IR spectrophotometer which is calibrated to detect peroxy acid. With this arrangement, the second scrubber 14 and valve 26 are not required.

If unsaturated hydrocarbons and ketones are present in the aldehyde containing air samples discussed above in connection with FIGS. 1 and 2, the output signals of the detectors 34 and 42, respectively, will be a function of the total amount of these constituents in the sample. If it is desired to determine any one of these constituents specifically, the scrubbers 12 must include a material which will remove the other constituents so that only the one being determined will be conveyed to the reaction chambers 22 for photo-oxidation.

Figure 3:
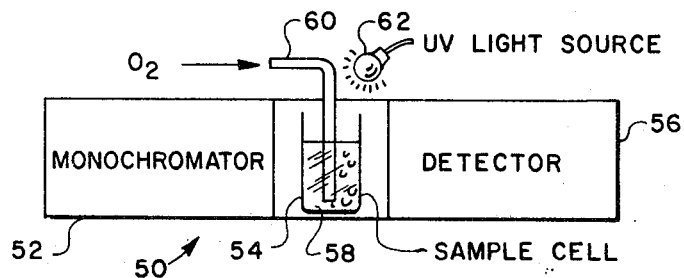
FIG. 3 is a schematic view of a third form of the invention for determining aldehydes in solutions.

The present invention may also be utilized for determining aldehydes (unsaturated hydrocarbons and ketones) in the vapor or liquid phase in a batch manner, as contrasted to the continuous monitoring process described above. In FIG. 3 there is shown schematically one form of a batch apparatus, generally designated 50. Apparatus 50 represents a spectrophotometer, which may be of the UV or IR type, that includes a monochromator 52, sample cell 54 and suitable detector 56. The cell 54 contains the sample which is indicated by numerals 58. A tube 60 is positioned with one end disposed in the sample cell 54 and the other end extending outside of the apparatus for connection to a source of oxygen, which may be either pure oxygen or air. The sample contained in the cell 54 is irradiated with a UV light 62 in the presence of oxygen delivered through the tube 60 and the resulting peroxy compounds are determined from the measurements of light absorption by the peroxy compounds. These light absorption measurements may be made either during or after irradition.

It is conceivable to monitor aldehydes by direct spectrophotometric means. However, the common aldehydes in the air have their strong absorption bands in the far UV. This makes the instrumentation cumbersome. The infra-red absorption bands are not strong enough in order to monitor the PPM levels of aldehydes in ambient air with cells of reasonable optical path lengths. However, the peroxy compounds can be advantageously monitored because their absorption is in the longer wavelengths, thus eliminating the need for the expensive vacuum UV arrangement. The absorption due to the peroxy compounds can be measured either in the near UV or in the infra-red region.

It can be appreciated that in the above-described embodiment, the sample 58 may be a liquid which has previously been photoexcited to form peroxy acid and then reacted with iodide ions to produce a resultant halogen content which is a function of the aldehyde content of the sample. Under such circumstances, the halogen containing solution would be analyzed by a spectrophotometer which is calibrated to detect halogens rather than peroxy acid.

Although we have herein shown and described our invention in what we have conceived to be the most practical and preferred embodiments, it is recognized that departures may be made therefrom within the scope of our invention, which is not to be limited to the details disclosed herein but is to be accorded the whole scope of the claims so as to embrace any and all equivalent structures and methods.

What is claimed is:

1. A method of determining the amount of at least one of the constituents, an aldehyde, ketone, or unsaturated hydrocarbon, in a sample comprising the steps of:
   photoexciting the sample in the presence of oxygen to convert the constituent in the sample into a peroxy acid; and
   determining the peroxy acid as a function of the constituent content of the sample by reacting the peroxy acid with halide ions to liberate free halogen; and
   determining the free halogen as a function of the constituent content of the sample.

2. A method of monitoring the level of at least one of the constituents, an aldehyde, ketone or unsaturated hydrocarbon, in a sample gas stream containing oxygen and the constituent comprising the steps of:
   photoexciting the sample gas stream to form a peroxy acid and ozone;
   reacting the acid and ozone with halide ions to liberate free halogen;
   producing a first output signal as a measure of said free halogen;
   providing a second gas stream having an oxygen content substantially the same as that of said sample gas stream;

photoexciting the second gas stream to form ozone;

reacting the ozone in the second gas stream with halide ions to liberate a second quantity of free halogen;

producing a second output signal as a measure of said second free halogen; and determining the difference between said first and second output signals as a function of the level of the constituent in the sample gas stream.

3. A method as set forth in claim 2 wherein said gas sample stream and said second gas stream both contain the constituent and interferents which oxidize halide ions, and including the additional steps of:

removing the interferents from the sample gas stream prior to photoexciting said stream; and removing the constituent and interferents from the second gas stream prior to photoexciting said stream.

4. In an apparatus for determining the level of at least one of the constituents, an aldehyde, ketone, or unsaturated hydrocarbon, in a sample gas stream containing oxygen and the constituent, the combination of:

a chamber containing photoexcitation means;

conduit means for conveying the sample gas stream to said chamber whereby the constituent in said stream is converted into a peroxy acid and the oxygen is converted into ozone in the chamber;

a second chamber for holding an aqueous halide solution;

second conduit means between said first mentioned chamber and said second chamber for conveying the effluent from the first chamber to the second chamber; and means for determining the peroxy acid content of the resulting gas product, including means for detecting halogens in the second chamber.

5. In an apparatus for determining the level of at least one of the constituents, an aldehyde, ketone, or unsaturated hydrocarbon, in a sample gas stream containing oxygen and the constituent, the combination of:

a chamber containing photoexcitation means;

conduit means for conveying the sample gas stream to said chamber whereby the constituent in said stream is converted into a peroxy acid and the oxygen is converted into ozone in the chamber;

a second chamber for holding an aqueous halide solution;

a second conduit means between said first mentioned chamber and said second chamber for conveying the effluent from the first chamber to the second chamber where the peroxy acid and ozone in the effluent oxidize the halide ions in the solution to form free halogen;

third conduit means for conveying a second gas stream containing oxygen but free of the constituent to said first chamber;

valve means for selectively controlling the flow of gas through said first and third conduit means to said first chamber; and means for determining the peroxy acid content of the resulting gas product including means for detecting halogens in said second chamber.

6. In an apparatus for continuously monitoring the level of at least one of the constituents, an aldehyde, ketone or unsaturated hydrocarbon, in air, the combination of:

a first chamber containing photoexcitation means;

first conduit means for conveying air to said first chamber;

second conduit means for conveying air free of the constituent of said first chamber;

selectively operable valve means for controlling the flow of gas through said first and second conduit means to said first chamber;

a second chamber for holding an aqueous halide solution;

third conduit means for conveying the effluent from said first chamber to said second chamber; and means for detecting the halogen content of the solution in said second chamber.

7. An apparatus as set forth in claim 6 wherein:

said first conduit means includes first scrubber means for removing from air interferents other than said constituent which oxidize halide ions; and said second conduit means includes second scrubber means for removing from air said constituent and said interferents.

8. An apparatus as set forth in claim 7 wherein said second conduit means joins said first conduit means between said first scrubber means and said first chamber;

said valve means being positioned at the junction of said first and second conduit means; and said valve means being movable to two positions, in one position said valve means allowing flow of gas from said first scrubber means to said first chamber, and in the second position said valve means allowing flow of gas from said second scrubber means to said first chamber.

References Cited

Niclause et al., Advances in Photochemistry, vol. 4, pp. 25 to 28, 33, 38, 39, 41, 43 relied on. By Noyes et al., editors, 1966, Interscience Publishers.

MORRIS O. WOLK, Primary Examiner

R. M. REESE, Assistant Examiner

U.S. Cl. X.R.

23—232, 254